Oct. 27, 1959  L. S. WASSERMAN ET AL  2,910,639
CORRECTIVE AUTO PILOT SERVOMOTOR SYSTEM
Filed March 22, 1954  2 Sheets-Sheet 1
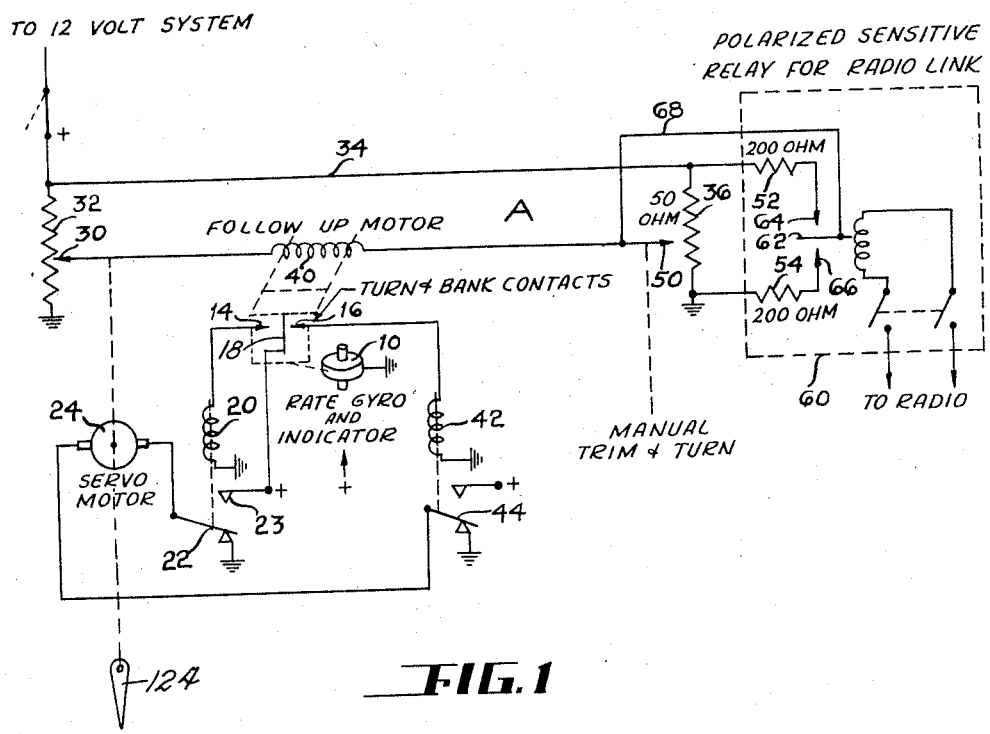
FIG. 1
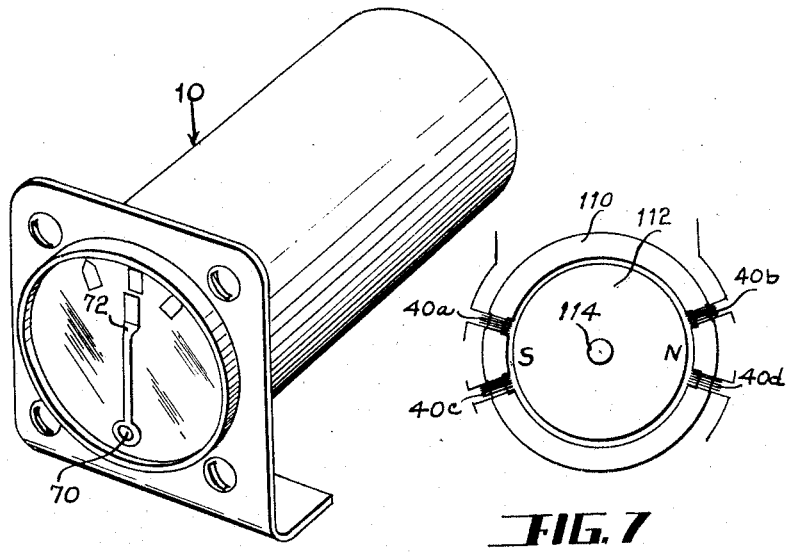
FIG. 2
FIG. 7
INVENTORS
LEE S. WASSERMAN
ADAM J. STOLZENBERGER
BY
THEIR ATTORNEYS

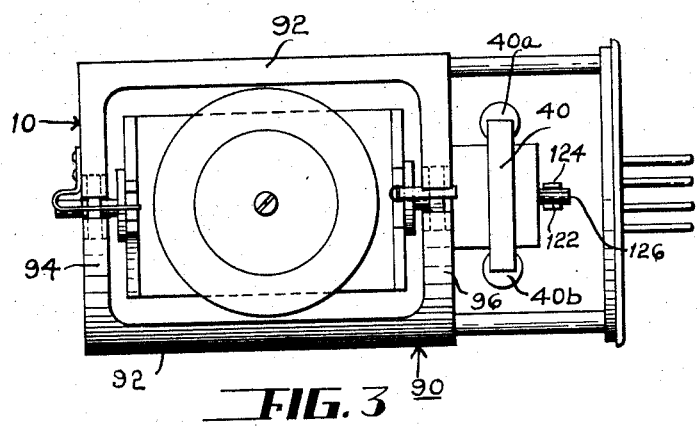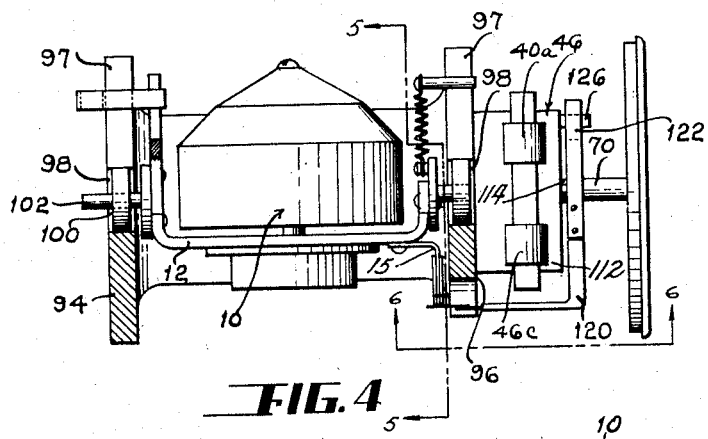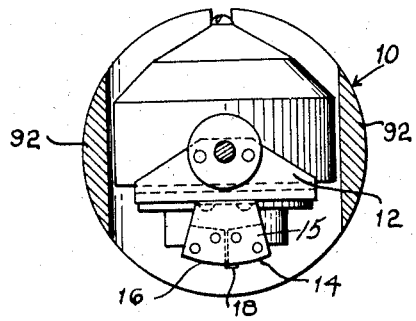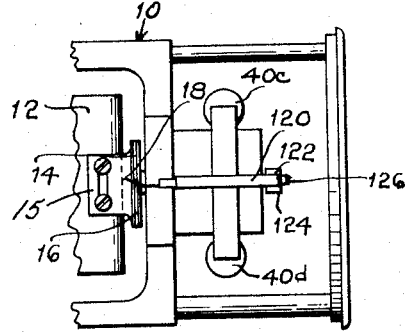

United States Patent Office 2,910,639
Patented Oct. 27, 1959

2,910,639

CORRECTIVE AUTO PILOT SERVOMOTOR SYSTEM

Lee S. Wasserman and Adam J. Stolzenberger, Dayton, Ohio, assignors to Globe Industries, Inc., Dayton, Ohio, a corporation of Ohio Application March 22, 1954, Serial No. 417,708

10 Claims. (Cl. 318—489)

This invention pertains to a single axis auto pilot and more particularly to an auto pilot for use in aircraft, although not necessarily so limited.

In the flying of airplanes there is a tendency for the airplane to roll and yaw, as is well known to those skilled in the art. If, for example, the right wing drops so that the right wing is lower than the left wing, the airplane will turn to the right. Slight adjustment of the rudder to the left to prevent this turn will cause the airplane to slip, so that the dihedral effect will raise the wing, as would application of the left aileron. In some airplanes, this interaction between roll and yaw has led to the use of an elastic connection between the ailerons and the rudder.

An object of this invention is to provide an auto pilot that will automatically straighten the plane by applying a corrective movement to the rudder and possibly the proper aileron, the rudder and the aileron being actuated into home position as soon as the airplane has again been stabilized. This single axis auto pilot provides maximum utility, dependability and safety in an automatic pilot system at a minimum cost.

The operation of the auto pilot depends upon two very small direct current servo-motors, which have proven very satisfactory in the miniature D.C. motor field. The turn and bank indicator, in addition to a motor powered gyro wheel, includes an air-dampening cylinder, ball-bank indicator, hand indicator mechanism and a wiping contactor mounted on an electric torque motor. When the gyro moves, due to a turn, the wiper energizes one of the servo-motor relays, which causes the control surface to move. Motion of the servo moves the wiper on a servo potentiometer, which unbalances an electrical bridge whose output energizes the torque motor. The resulting motion of the torque motor moves the wiper in such a way as to remove the signal to the servo relay. This extremely simple follow-up system eliminates the complexity and lack of flexibility inherent in mechanical follow-ups.

The servo-motor receives its torque from a powerful actuator. The servo output is coupled to the output pulley by means of a friction clutch which is manually engaged. The control of this clutch mechanism by the pilot plus the slip possibilities provided by such a clutch, insure the safety of the installation. A further factor of safety has been added by the fact that the clutch can be released by one-quarter turn of the operating handle. The servo-motor incorporates its actuating relays plus the potentiometer which forms half of the follow-up bridge. The control panel of the airplane contains the main off-on switch, fuse, balance potentiometer and radio link off-on switch and relays. The balance potentiometer serves as half of the follow-up bridge and is used to trim out a turn, or automatically it can be used to turn the airplane as desired through the auto-pilot, when the auto-pilot is engaged. A radio link switch engages the radio link relay to the radio. Operation of this relay unbalances the follow-up bridge by means of fixed resistors. Here, again, the simplicity of coupling the electrical follow-up to a radio signal demonstrates the advantage of such a follow-up system. For those cases where radio outputs are too small to operate the radio link relay, a small electronic amplifier may be included in the control box.

Other objects and advantages reside in the construction of parts, the combination thereof and the mode of operation, as will become more apparent from the following description.

In the drawings, Figure 1 is a schematic wiring diagram of the single axis auto pilot.

Figure 2 is a perspective view of the gyroscope.

Figure 3 is a side elevation view of the gyroscope.

Figure 4 is a top plan view of the gyroscope with parts shown in section.

Figure 5 is a cross sectional view, taken substantially on the line 5—5 of Figure 4.

Figure 6 is a fragmentary, enlarged view looking in the direction of the arrow 6—6 of Figure 5.

Figure 7 is an enlarged schematic view of the follow-up motor.

Before describing the operation of the single axis auto pilot, the component parts of the electrical circuit, as shown in Figure 1, will first be described. Referring to this figure, the reference numeral 10 indicates a rate gyroscope, the gimbal of which has attached thereto a bracket 15 that supports a pair of contacts 14 and 16. An adjustable contact 18 is mounted between the contacts 14 and 16, so that as the rate gyroscope moves the contact 14 or 16 to the right or to the left, as viewed in Figure 1, the contact 18 engages the contact 14 or 16, as the case may be. The contact is connected to a suitable source of electrical energy, as for example, a 12 volt direct current system. For example, when the contact 18 engages the contact 14, a relay 20 is energized to close the switch 22 by engaging the contact 23, which energizes a servo-motor 24, causing it to rotate in one direction.

When the contact 16 moves into engagement with the contact 18 or the contact 18 moves into contact with the contact 16, as the case may be, a relay 42 is energized, closing a switch 44. The movable contact element of the switch 22 is then grounded, so as to close the circuit through the servo-motor; but the current flows through the servo-motor in the opposite direction, thereby reversing the direction of the servo-motor. By way of explanation, it might be stated that the servo-motor 24 is preferably provided with permanently magnetized poles. This particular servo-motor that has been used is a very small motor, operating at an extremely high speed. This permits the use of a very light weight motor developing a large torque through a suitable planetary gear reducing mechanism. The servo-motor, when rotating in one direction, actuates a sliding contact 30 in one direction on the potentiometer 32, and when it rotates in the opposite direction, it actuates the sliding contact 30 in the opposite direction on the potentiometer 32. This potentiometer 32 is connected in parallel with a potentiometer 36, so as to form what may be referred to as a normally balanced circuit including the two potentiometers, the lead 34 and the windings 40 of a torque or follow-up motor. This balanced circuit has one terminal connected to the 12 volt system and the other terminals grounded, as shown. No current flows through the follow-up motor windings 40 when the circuit is balanced, in that the voltage drop between the source of electrical energy and the contact 30 is then equal to the voltage drop of that portion of the potentiometer 36 located between the 12 volt system and the contact 50. That being the case, there is zero voltage across the windings 40 of the follow-up motor. Whenever the contact 30 is adjusted, the circuit A becomes unbalanced and the current flows through the windings 40 either to the left or to the right, as shown in Figure 1, depending upon the polarity of the voltages supplied to the windings 40. Whenever a current flows through the follow-up motor, the movable contact 18 is shifted to the right or to the left, depending upon the direction of flow of current through the windings 40, for purposes which will be described more fully later. The follow-up motor actuates the contact 18 away from the contact 14 or 16, as the case may be, to de-energize the servo-motor 24. The operation of the servo-motor 24 and the contacts 14 and 16 will be described more fully under the Mode of Operation.

The balanced circuit A may also be unbalanced manually by actuating a manual trim and turn knob on the instrument board, that has not been shown, actuating a movable contact 50 of the potentiometer 36. By actuating the manual trim and turn knob in one direction, the contact 50 is actuated upwardly, as viewed in Figure 1, so as to decrease the resistance between the 12 volt system and the movable contact 50, or by turning the manual trim knob in the opposite direction, the movable contact 50 may be adjustable downwardly, so as to increase the resistance of the potentiometer 36 found in the balanced circuit A.

A pair of normally open resistances 52 and 54 are attached to the terminals of the potentiometer 36. Resistance 52 is connected to a stationary contact 64 and the resistance 54 is connected to a fixed contact 66. Contacts 64 and 66 are mounted in close proximity to each other. A movable contact 62 is mounted between the contacts 64 and 66 and is normally out of contact with these contacts. The contact 50 on the potentiometer 36 is connected by means of a lead 68 to the contact 62. A polarized sensitive relay for the radio circuit shown schematically at 60 may be used for adjusting the contact 62 into engagement with either the contact 64 or the contact 66. When the contact 62 engages the contact 64, the resistance 52 is connected in parallel with the portion of the resistance of the potentiometer 36 connected into the balanced circuit, thereby reducing the voltage drop between the 12 volt system and the contact 50, so as to cause an unbalanced condition. In the event the contact 62 engages the contact 66, the resistance 54 is connected in parallel with that portion of the potentiometer 36 connected between the contact 50 and ground, thereby reducing the resistance of this portion of the circuit, so as to increase the voltage drop from the 12 volt system and the contact 50 to unbalance circuit A.

Before describing the theory of operation, a brief description of the gyroscope and the parts associated therewith will be made. As is well known to those skilled in the art, when an airplane passes through a curved path, the pilot may not be aware of the fact that the airplane is not level due to centrifugal force. A gimbal 12 of the gyroscope is connected by a shaft 70 to an indicator 72, visually indicating the rate of turn of the airplane. The particular type of gyroscope used will only be briefly referred to, as this will form the subject matter of another application for patent to be filed. Suffice to state that the gimbal 12 is mounted in a frame 90 that includes a pair of arcuate cylindrical sectors 92, one on either side, and a pair of end sectors 94 and 96. Each of these end sectors is provided with a vertical slot 97 terminating in an enlarged circular opening 98. Outer races of circular bearings are in the circular openings 98. The bearings 100 are inserted through the outer ends of the end frames 94 and 96. By this arrangement, it is possible to use a frame 90, wherein the side portions 92 and the end frame portions 94 and 96 may consist of a single piece which may be formed as a die casting. The gimbal may be inserted by means of the shafts 102 being inserted through the vertical slots, then the bearings 100 slipped in from the outer ends over the ends of the shaft, so as to journal the gimbal in the frame.

The follow-up motor 46 is mounted on the end 96 of the frame 90. The follow-up motor winding may consist of a plurality of coils 40a, 40b, 40c and 40d, as shown. These coils are wound upon portions of a soft iron ring forming a stator surrounding a magnetized rotor. The movable contact 18 is connected by a bracket 120 to the magnetized rotor. When the field windings 40 are deenergized, the contact 18 is positioned between the contacts 14 and 16, that is, when the plane is maintained on a straight course.

The follow-up or torque motor has been shown schematically in Figure 7. It consists of a soft iron ring 110 functioning as a stator and a permanent magnet 112 functioning as a rotor. The stator 110 is fixedly attached in any suitable manner to the end frame 96. It is provided with four windings 40a, 40b, 40c and 40d. These windings correspond to the winding 40 shown schematically in Figure 1. These coils are connected in any suitable manner into the balanced circuit A. They may be connected in series or in parallel or in series parallel relation. The coils 40a–b–c–d are wound so as to have a cumulative effect, that is, when the current flows in one direction through the follow-up winding 40, a torque is applied to move the rotor clockwise or counterclockwise, that is, the torque is clockwise when the current flows in one direction and counterclockwise when the current flows in the opposite direction. The rotor 112 is mounted upon a shaft 114 having fixedly mounted thereon an L-shaped bracket 120 carrying the contact 18. The bracket 120 supports a pair of laterally disposed springs 122 and 124 projecting beyond the end of bracket member 120 and straddling a stud 126 fixedly mounted with respect to the end frame 96. These springs 122 and 124 exert a bias upon the bracket 120 always tending to center this bracket and thereby center the contact 18. However, this biasing effect is counteracted by the torque on the rotor 112 when a current flows into the follow-up motor coils. As soon as the coils 40a–b–c–d are de-energized, the springs 122 and 124 center the contact 18, the spring 122 centering the bracket 120 whenever the top of the bracket 120 has been raised, as viewed in Figure 6, and the spring 124 exerting a force and centering the bracket 120 whenever the upper portion (as viewed in Figure 6) has been moved downwardly off center.

The servo-motor 24, as stated above, rotates at a very high rate of speed, probably on the order of 12,000 r.p.m. It is geared down through the planetary gear system, so that the output shaft rotates at a very slow speed, so to speak, creeps. In addition to reducing the speed, this planetary gear system has several advantages. One is that a very small motor, rotating at a very high speed, is capable of developing a very large torque at the output shaft. Furthermore, when the servo-motor is de-energized and stops, the output shaft is held in position, in that any force applied to the output shaft will not rotate the motor. By this arrangement, it remains in this position until the servo-motor is again energized, so as to prevent creeping of the rudder from an adjusted position. Any air pressure applied to the rudder has no effect thereon. The only adjustment of the rudder that can be made when the single axis auto pilot disclosed herein is used, is made solely by the servo-motor 24.

*Mode of operation*

When the balanced bridge circuit A is balanced so that no current flows through the coils 40 of the follow-up motor and the airplane is level, the contact 18 is positioned in what might be referred to as a dead center or a neutral position located between the contacts 14 and 16 mounted upon the gimbal of the gyroscope. Let it be assumed, for the sake of explanation, that the airplane turns to the right and let it be assumed that the contact 14 is located to the right and the contact 16 is located to the left on the gimbal, as viewed in Figure 5. In view of the fact that the gyro moves about its pivot shafts 102, the contact 18 will move into engagement with the contact 16. In so doing, the relay 42 will be energized so as to close the switch 44, thereby energizing the servo-motor 24. As soon as the servo-motor 24 is energized, the rudder is moved to the left, thereby tending to straighten the airplane and at the same time the contact 30 is actuated, so as to unbalance the circuit A, causing a current to flow through the windings 40a–b–c–d, which applies a torque to the rotor, to actuate the contact 18 out of engagement with the contact 16. Since the springs 122 and 124 are biasing the contact 18, the torque motor 40 must work against the springs, the energy supplied by the torque motor being proportional to the deflection required to separate the contacts 16 and 18. The energy supplied to the torque motor is determined by the position of the wiper 30 and, hence, by the position of the control surface, since both the wiper 30 and the control surface are driven by the servo-motor 24. Thus, the position of the control surface is determined by the deflection of the contact 18. This deflection is the deflection of the gyro with respect to the craft. It is thus clear that the correction applied to the control surface is proportional to the tilt of the craft relative to the gyro.

As soon as the contact 18 is disengaged from the control 16, the servo-motor 24 is de-energized. However, due to the unbalanced condition of the circuit A, the follow-up motor remains energized, thereby holding the contact 18 in an off-center position. As the airplane approaches zero rate of turn, the contact 18, being away from the normal dead center position, engages the contact 14, thereby energizing the relay 20, closing the switch 22 to energize the servo-motor 24. This servo-motor now rotates in a direction opposite to the previous direction of rotation, thereby actuating the rudder into its normal home position and actuating the contact 30 into a balanced position, thereby de-energizing the follow-up motor, namely, the windings 40a–b–c–d. As soon as the windings of the follow-up motor are de-energized, the two springs 122 and 124 will aid in shifting the rotor and the contact 18 into dead center. As soon as the contact 18 moves into dead center and the airplane is flying straight, the servo-motor is de-energized, circuit A is balanced and the airplane will continue on a straight course.

The course may be changed. This may be accomplished by actuating a manual trim and turn knob on the instrument board (not shown), so as to actuate the movable contact 50 upwardly or downwardly, so as to unbalance the circuit A. As the circuit A is unbalanced, the follow-up motor is energized, so as to apply a torque to the rotor in a clockwise direction or in a counterclockwise direction, as the case may be. Let is be assumed that it is desired to veer to the left. The rotor is then shifted slightly in a counterclockwise direction, as viewed in Figure 7. In so doing, the contact 18 comes in contact with the contact 16, so as to energize the servo-motor 24, thereby actuating the rudder towards the left. The movable contact 30 will also be adjusted to move the contact 18 out of engagement with the contact 16; but not far enough to balance the circuit A so as to hold the airplane on the curved course until the manual trim and control knob is adjusted to home position.

The course may also be controlled by the polarized sensitive relay 60 of a radio circuit. This is accomplished by actuating the contact 62 into engagement with the contact 64 or the contact 66, so as to unbalance the circuit A, thereby energizing the follow-up motor to cause a relative movement between the motor and the stator, so as to energize the servo-motor 24 to do two things, one, to actuate the contact 30 and, two, to actuate the rudder, so as to cause the airplane to curve to the right or to the left, as the case may be. The circuit A is unbalanced, so that the voltage drop across the resistance between the 12 volt system and the movable contact 30 is unequal to the voltage drop between the 12 volt system and the contact 50, so that the follow-up motor remains energized and the airplane will be kept on a curved path until it is released from this path by the radio signal.

In the event the airplane is turning, due to atmospheric disturbances, so as to shift the airplane from the curved path selected by the manual control knob or the radio signal, the contact 18 will again engage one of the contacts 14 and 16, resulting in the servo-motor making a correction of the rudder and at the same time maintaining the circuit A unbalanced, so as to change the energization of the stator field windings 40a, 40b, 40c and 40d to prevent overthrow by causing the contact 14 or 16, as the case may be, to move out of contact with the movable contact 18, the airplane returning to the proper curve of flight.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A single axis auto pilot for use in an airplane, said auto pilot including a source of electrical energy, a servo-motor, a torque motor, a rate gyro and circuit means for connecting the servo-motor and the torque motor to the source of electrical energy, said circuit means including a normally balanced bridge circuit, the torque motor being located in a bridge portion of the circuit, a variable potentiometer, a pair of contact means, one of the contact means being mounted on the gimbal of the rate gyro and the other contact means being associated with the torque motor and normally tilting with the airplane, and means for biasing the contact means connected to the torque motor, the two contact means being out of contact with each other when the airplane is flying on a straight course and is set to fly on that straight course, the other contact means contacting the contact means on the gimbal of the rate gyro when the airplane tilts, the closing of the contact means energizing the servo-motor to feather the rudder of the airplane to straighten its course and to adjust the variable potentiometer so as to unbalance the bridge circuit, thereby energizing the torque motor to shift said other contact means in a direction opposite to the direction of tilt of the airplane to move the other contact means out of engagement with the contact means mounted on the gimbal, thereby interrupting the circuit to the servo-motor so as to hold the rudder in the feathered position.

2. A single axis auto pilot according to claim 1, wherein the means for biasing the contact means connected to the torque motor are resilient.

3. A single axis auto pilot for use in craft, said auto pilot including a source of electrical energy, a servo-motor, a torque motor, a rate gyro and circuit means for connecting the servo-motor and the torque motor to the source of electrical energy, said circuit means including a normally balanced bridge circuit, a pair of variable potentiometers, one in each side of the bridge circuit, and a pair of contact means, one of the contact means being mounted on the gimbal of the rate gyro, the other contact means being associated with the torque motor and normally tilting with the craft, means for biasing the contact means connected to the torque motor, the two contact means being out of contact with each other when the craft is normally set with respect to the controlled axis and is set to follow on a straight course, the other contact means contacting the contact means on the gimbal of the rate gyro when the craft tilts, the closing of the contact means energizing the servo-motor to trim the control surface of the craft to straighten its course, and to adjust one of the variable potentiometers so as to unbalance the bridge circuit, thereby energizing the torque motor to shift said other contact means in a direction opposite to the direction of tilt of the craft to move the other contact means out of engagement with the contact means mounted on the gimbal, thereby interrupting the circuit to the servo-motor so as to hold the control surface in position, and means for adjusting the other potentiometer to unbalance the bridge circuit to thereby energize the torque motor to cause the craft to follow a curved path.

4. A single axis auto pilot according to claim 3, wherein the means for biasing the contact means connected to the torque motor is a pair of springs.

5. A single axis auto pilot for use in a craft, said auto pilot including a source of electrical energy, a servo-motor, a torque motor, a rate gyro and circuit means for connecting the servo-motor and the torque motor to the source of electrical energy, said circuit means including a normally balanced bridge circuit, a pair of variable potentiometers, one in each side of the bridge circuit, a pair of contact means, one of the contact means being mounted on the gimbal of the rate gyro and the other contact means being associated with the torque motor and normally tilting with the craft, and means for biasing the contact means connected to the torque motor, the two contact means being out of contact with each other when the craft is normally set with respect to the controlled axis and is set to follow on a straight course, means for adjusting one of the potentiometers to unbalance the bridge circuit to thereby energize the torque motor to cause said other contact means to move into engagement with the contacts mounted on the gimbal, thereby energizing the servo-motor to trim the control surface of the craft to cause the craft to follow a curved path, the servo-motor energizing the other potentiometer to balance the bridge circuit to de-energize the torque motor thereby causing the craft to follow said curved path.

6. In an automatic pilot for use on a craft, the combination including a rate gyro having a pair of contacts mounted on the gimbal thereof, a pair of electromagnets, one for each of the contacts, a pair of switches actuated by the electromagnets, there being one switch for each electromagnet, the switches contacting the ground when the electromagnets are de-energized and connected to a source of electrical energy when the electromagnets are energized, a servo-motor having one terminal attached to one of the switches and the other terminal attached to the other switch, a bridge circuit normally balanced, means for unbalancing the bridge circuit, a torque or follow-up motor connected across the bridge circuit, a contact actuated by the follow-up motor whenever the bridge circuit is energized to engage one of the contacts upon the rate gyro to thereby energize the electromagnet connected to the contact on the rate gyro to energize the servo-motor, and means for biasing the contact actuated by the follow-up motor.

7. In an automatic pilot for use on a craft, the combination including a rate gyro, contact means mounted on the gimbal of the rate gyro, a second contact means mounted for tilting movement with the craft, one of the contact means having a pair of contacts, the other contact means having a single contact normally positioned between the pair of contacts so as to engage one of the contacts when the craft tilts to one side and so as to engage the other contact when the craft tilts in an opposite direction, means for biasing said single contact, a pair of electromagnets, one for each of the contacts, a pair of switches actuated by the electromagnets, there being one switch for each electromagnet, the switches contacting the ground when the electromagnets are de-energized and being connected to a source of electrical energy when the electromagnets are energized, a servo-motor having one terminal attached to one of the switches and the other terminal attached to the other switch, a bridge circuit normally balanced, means for unbalancing the bridge circuit, a torque or follow-up motor connected across the bridge circuit, said follow-up motor tilting the contact means normally tilted by the craft to engage the contact means upon the rate gyro to thereby energize the electromagnet connected to the contact on the rate gyro to energize the servo-motor.

8. In an automatic pilot according to claim 7, wherein the servo-motor actuates the means for unbalancing the bridge circuit.

9. In an automatic pilot according to claim 7, wherein a manual control actuates the means for unbalancing the bridge circuit.

10. In an automatic pilot according to claim 7, wherein a polarized sensitive relay for a radio link actuates the means for unbalancing the bridge circuit.

References Cited in the file of this patent
UNITED STATES PATENTS

| | | |
|---|---|---|
| 1,996,055 | Boykow | Apr. 2, 1935 |
| 2,234,326 | Tiebel | Mar. 11, 1941 |
| 2,262,790 | Bean et al. | Nov. 18, 1941 |
| 2,349,287 | Krussman | May 23, 1944 |
| 2,654,859 | Drnek | Oct. 6, 1953 |
| 2,751,542 | Woodward | June 19, 1956 |